United States Patent Office 3,794,578
Patented Feb. 26, 1974

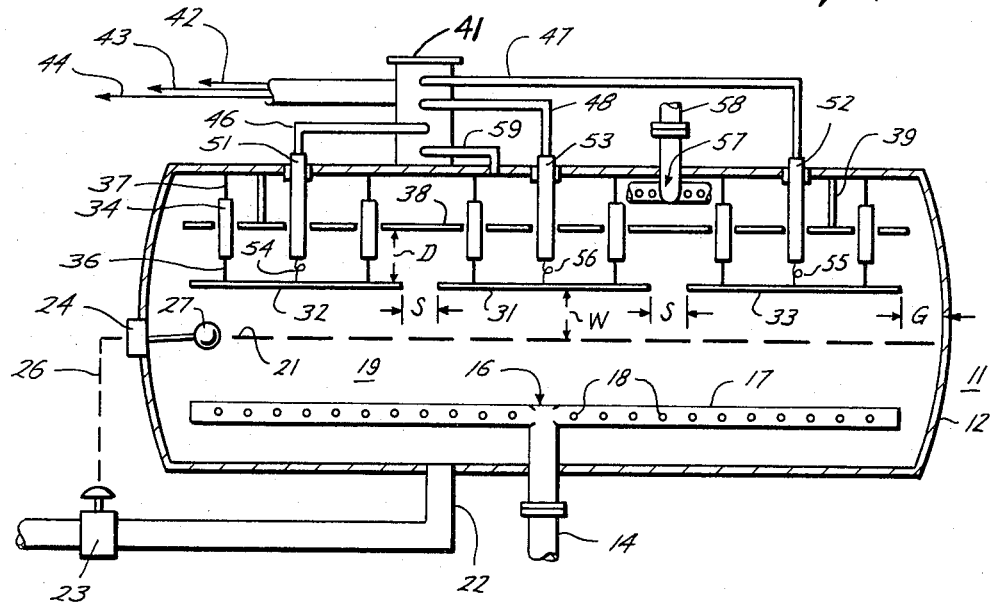

3,794,578
THREE PHASE ENERGIZED ELECTRICAL TREATER
Frederick D. Watson, Houston, Tex., assignor to Petrolite Corporation, St. Louis, Mo.
Filed Dec. 26, 1972, Ser. No. 317,914
Int. Cl. B03c 5/00, 5/02
U.S. Cl. 204—305
13 Claims

ABSTRACT OF THE DISCLOSURE

An electrical field treater operating from three phase AC current for resolving a dispersion formed of a continuous oil phase containing a dispersed water phase. The treater comprises a metal vessel which includes a dispersion inlet and outlets to remove the continuous oil phase and coalesced water phase. A transformer arrangement, energized from three phase AC current, provides in three secondary windings elevated voltages for energizing three electrodes mounted in electrical isolation within the vessel. Two of the secondary windings are phased 120° apart and energize the electrodes mounted to each side of the third electrode. The third electrode is energized by a third secondary winding which is phased 60° apart from the other two secondary windings. High tension conductors interconnect the secondary windings with the electrodes. As a result, the side positioned electrodes are energized to substantially the same potential magnitude relative to the third electrode, and all electrodes are at the same potential relative to the metal sidewalls of the vessel.

BACKGROUND OF THE INVENTION (1) Field of the invention

This invention relates to the resolving of dispersions having a continuous oil phase containing a dispersed water phase. More particularly, the present invention relates to electric field treatment for resolving such dispersions.

(2) Description of the prior art

Electrical treaters have been employed to resolve dispersions (emulsions) with high-potential electric fields for over sixty years. These dispersions are formed of a continuous oil phase, which terminology includes the various hydrocarbons such as crude oil, and distillates and residium derived therefrom during refining and other hydrocarbon processing. Also included in this terminology are various organic liquid materials which are water immersible and have a relatively low electrical conductivity and a low dielectric constant compared to water. The dispersed water phase may be water, brine, or other aqueous phase material such as acids or caustics. Where the continuous oil phase is crude oil, and like organic liquid materials, the treater employs an electric field created by application of an AC potential for resolving the dispersion. In some applications, the AC potential is provided by a single phase transformer to produce the necessary high potential for energizing electrodes which are mounted in electrical isolation within the vessel forming the treater. Usually, the potential applied to the electrodes is within the range of between about 10 and 30 kilovolts AC. The physical spacing between the energized electrodes, and adjacent electrical grounds (such as metal vessel walls and grounded electrodes) is usually between 500 and 6,000 volts AC. The energization of electrical field treaters using single phase power sources is satisfactory where the consumption of current within the treater is relatively small, or for other reasons.

Where the electric field treater presented an electrical system which consumes relatively large amounts of current, single phase power sources for energizing electrodes present many disadvantages. For example, in industrial facilities such as oil refineries and chemical plants, the electrical power is received from primary sources through power lines at polyphase potentials of 1150, 2300 or 4000 volts AC. Power substations within the industrial facilities employ transformers which stepped down the AC voltages to 230, 440 and 550 volts (three phase) for power distribution on three conductors within the facility. The industrial use of three phase power has certain well known advantages. In three phase AC power distribution, each of the three conductors carry a current reflecting the vector summed currents of the other conductors. Thus, the three phase service employs conductor sizes much smaller than for a corresponding current demand in single phase installations. In addition, the requirements of the National Electrical Code (and usually the safety requirements of the industrial facility) require that the secondary windings of the three phase transformers include a neutral wire. The neutral wire provides a common ground connection between the transformer arrangement and the common ground circuits of all the electrical machinery receiving polyphase power. Thus, should a fault develop in the distribution system, no secondary voltage from the transformer could possibly be applied to the primary winding of the transformer.

In industrial facilities, the installation of the electrical field treater has involved the use of a separate transformer arrangement for energizing the electrodes. This transformer arrangement is required since the secondary winding potentials applied to these electrodes are substantially higher than those of the three phase power sources providing electrical power to the facilities. Also, the transformer arrangement provides electrical isolation of the electrical field treater from the various power distribution circuits within the facility. Over forty years ago, the great advantages of employing multiphase transformer arrangements for energizing electrical field treaters was discovered. Many electrical treaters were installed by the Petroleum Rectifying Company of California and operated from polyphase power. In current years, these electrical treaters are available under the trademark designation Petreco® Dehydrators. These treaters employ three energized electrodes spaced with respect to each other grounded electrodes and the metallic vessel in which they were contained. The source potential of three phase AC current was applied to the primary windings of a transformer arrangement. The primary windings could be arranged in a Y connection, but preferably a delta connection is employed. Each of the three phase source conductors can have a choke coil in series with the primary windings. The choke coil limits the current which could flow through the transformer arrangement should the secondary windings be shorted together or otherwise acquire a low impedance load creating excessive current flows. The secondary windings preferably are connected in a Y with the neutral point connected by a ground conductor directly to the vessel of the electric dehydrator or treater. As a result, the electrodes within the treater are energized to elevated potentials with a 120° phasing of currents. These potentials are greater between adjacent electrodes, but all electrodes are at the same potential relative to the grounded vessel of the electrical field treater.

One advantage of the Y arranged secondary windings is that the "line" voltage is 1.73 times the "phase" potential across any of the secondary windings of the transformer arrangement. Another advantage of the Y secondary is that all secondary windings have a common point which is electrical ground. Energizing of an electrical field treater employing three phase AC potentials with Y connected secondaries in a transformer arrangement has been used throughout the intervening years to great advantages. One of the primary advantages of this electrical system is that the currents are substantially balanced in each of the conductors which apply three phase AC potentials to the primaries. Thus, the current balancing within the power distribution system of the industrial facility is preserved irrespective of the electric treater consuming large or small amounts of current. The electrical field treater reacts to varying loads in the same manner as a polyphase electric motor.

In the last decade, electrical field treaters, especially those used for desalting crude oil in oil refineries, have become relatively large in throughput capacity. For example, electrical field treaters formed of horizontal cylindrical vessels with diameters of up to 12 feet and lengths of 90-120 feet have become relatively common. These electrical field treaters are constructed substantially as shown in U.S. Pat. 2,855,359. However, the energized electrode is segregated into three electrically separated sections which are energized from a three phase transformer arrangement connected with secondary windings in a Y to produce the high potentials for energizing the electrode sections. For manufacturing convenience, these electrodes generally have the same horizontal area exposed to fluid flow and consume relatively like current magnitudes. The spacing between the energized electrodes, and between these electrodes and the adjacent grounded sidewalls of the vessel may be the same or may be adjusted sidewalls of lowing manner. As mentioned, the potential of the three electrodes energized from the Y connected secondaries receiving three phase AC power are of the same magnitude relative to electrical ground. The potential between any electrode and the grounded sidewall of the vessel is the same magnitude as the phase potential. However, the potentials between electrodes on each side of a central electrode are 1.73 times the phase potential relative to the central electrode. Thus, the construction of this type of electrical treater is usually of two design. In the first design, the spacing between the energizing electrodes and adjacent grounds is maintained constant. As a result, the potential gradient between adjacent energized electrodes is greater than that between any energized electrode and adjacent grounds having the same spacings. In the second design, the spacing between adjacent electrodes is increased by 1.73 times the spacing between the energized electrodes and adjacent grounds. These varied spacings provide for maintaining the same electrical gradient between the adjacent electrodes and between the electrodes and adjacent metal grounds within the electric field treater. Therefore, only the latter design produces a configuration within the electric treater where varied spacings produce a uniform electrical gradient between adjacent energized electrodes and the adjacent grounds supplied by the grounded metal components of the electric field treater.

The electrical field treater of the present invention provides for utilizing a polyphase transformer arrangement receiving power from three phase AC current sources as employed in industrial facilities. Three secondary windings of the transformer arrangement are employed for supplying high potential energization of three energized electrodes within the treaters. These secondary windings are so arranged that the potentials between adjacent energized electrodes are equal, and equal to the potential difference between any energized electrode and grounds provided by the adjacent metal portions of the treater. The spacings between the electrodes and adjacent grounds on the vessel forming the electric treater can be made identical. As a result, all electrical gradients between the electrodes, and between the electrodes and grounds will be identical in magnitude. This system greatly simplifies the design and construction of the electric field treaters. In addition, all the advantages of balanced currents in polyphase energization of the electrical field treater are preserved as with earlier treaters employing Y connected secondary windings for energizing the electrodes within the electric treater.

SUMMARY OF THE INVENTION

In accordance with the present invention, there is provided an electrical field treater operated from three phase AC current for resolving a dispersion formed of a continuous oil phase containing dispersed water. The treater comprises a metal sidewall vessel and has inlet means for introducing the dispersion into the vessel and outlet means for removing from the vessel the continuous oil phase and the coalesced water phase. A source of three phase AC current is connected to a transformer means having three phase primary windings. The transformer means has three secondary windings magnetically coupled to the primary windings with each of the secondary windings having a common connection to a conductor grounded to the metal sidewalls of the vessel. Two of the secondary windings are phased 120° apart and the third secondary winding is phased 60° apart from the other two of the secondary windings. First, second and third electrode means are mounted in electrical isolation within the vessl. The electrode means are adapted to be energized from the transformer means to a potential creating an electrical field suitable to promote resolution of the dispersion. The first electrode means is mounted centrally within the vessel and the second and third electrode means are mounted adjacent the first electrode means. The secondary windings of the transformer means are interconnected by high tension conductors with the electrode means. The first electrode means is energized from the third secondary winding. The second and third electrode means are energized from first and second secondary windings, respectively. As a result, the second and third electrode means are energized to substantially the same potential magnitude relative to the first electrode means and all the electrode means are at the same potential relative to the metal sidewalls of the vessel.

DESCRIPTION OF THE DRAWINGS

FIG. 1 is a vertical longitudinal section taken through an electrical field treater illustrating one embodiment of the present invention;

FIG. 2 is an electrical diagram illustrating a three phase transformer arrangement for energizing the electrodes of the treater shown in FIG. 1; and FIG. 3 is a vector diagram illustrating the relationship of the line voltages with their angular phase relationships relative to one another and to a common ground connection of the secondary windings of the transformer arrangement illustrated in FIG. 2.

DESCRIPTION OF SPECIFIC EMBODIMENTS

Referring now to FIG. 1, there is shown as an illustration, an electrical field treater 11 which includes a vessel 12 having metal sidewalls. The treater receives the dispersion delivered through a pipe 14 into a distributor 16 having a longitudinal section 17 carrying a plurality of openings 18. The dispersion is uniformly introduced from the openings 18 into the vessel 12. The dispersion passes upwardly through a body of water 19 (maintained within the lower portion of the vessel 12) and emerges from the interface 21 into an electrical field established within the upper portion of the vessel 12. The interface 21 of the body of water 19 is maintained at a suitable horizon by the regulated withdrawal of water through an outlet 22 in which flow is controlled by a motor valve 23. The motor valve 23 is actuated by a controller 24 through an interconnection indicated by chain line 26. The controller 24 is operated by a float 27 which monitors the horizon at which the interface 21 resides within the vessel 12.

The electric field within the vessel 12 may be formed by any suitable mechanical arrangement having at least three sets of electrode means. The electrode means are energized to elevated potentials for creating an electric field for resolving the dispersion being introduced through the pipe 14. The electrode means will include (1) first electrode means centrally disposed within the vessel 12 and (2) additional electrode means disposed adjacent the first electrode means. The additional electrode means usually reside between the first (central) electrode means and the metal sidewalls of the vessel 12. These electrode means may take any configuration desired, but usually they will be arranged along a horizontal plane in the vessel 12.

In one embodiment of the present treater, the electrode means are formed by foraminous metal electrodes 31, 32 and 33. The electrode 31 is disposed centrally within the vessel 12. The electrodes 32 and 33 are disposed adjacent the electrode 31. In the treater 11, the electrodes 32 and 33 are positioned between each side of the electrode 31 and the metal sidewall of the vessel 12. The energized electrodes are preferably constructed from a plurality of longitudinally extending metal rods spaced across transverse metal brackets to provide a suitable hanger connection arrangement. The electrodes are suspended from a plurality of insulators 34 by hanger rods 36 and supported by hanger rods 37 from the upper portion of the vessel 12. The electrodes could be mounted by other systems in electrical isolation within the vessel 12. In addition, the energized electrodes are spaced from one another to receive a three phase energization from the secondary line voltages of a polyphase transformer arrangement.

The upper surface (interface 21) of the body of water 19 provides a grounded electrode. The metal portions, including the sidewalls of the vessel 12, serve as grounded electrical surfaces relative to the energized electrodes. If desired, a grounded electrode 38 may be positioned in vertical spaced relationship to the energized electrodes. The grounded electrode 38 can be formed of a plurality of longitudinally extending rods carried up on transversed brackets and directly suspended by metal hangers 39 from the upper surfaces of the vessel 12. Thus, the energized electrodes are spaced apart from adjacent electrical grounds of the treater 11 which includes the interface 21, the metal portions (sidewalls, etc.) of the vessel 12, and the grounded planar electrode 38.

In particular, the electrode 31 is spaced by a distance "S" from the adjacent electrodes 32 and 33. The energized electrodes are separated by a distance "D" from the grounded electrode 38. In addition, the energized electrodes are spaced by a distance "W" from the interface 21. The electrodes are preferably spaced a distance "G" from the adjacent metal sidewalls of the vessel 12. For purposes of this description, consider that the dimensions S, D, W and G are the same. If the energized electrodes are connected to the high potential secondary windings in a conventional Y connected polyphase transformer, the potential between the energized electrode 31 and each of the energized electrodes 32 and 33 would be equal to the line voltage (1.73 times the phase voltage) from the secondary windings of the transformer. The potential between any one energized electrode and the electrical grounds within the vessel 12 would be equal to the phase voltage from the secondary windings of the transformer. The voltage gradient across the distance S would be 1.73 times greater than the voltage gradient across the spacings D, W and G. As a result, energization of the electrical field treater 11 by prior art usage of polyphase Y connected secondary windings in polyphase transformers provides differential voltage gradients for the same spacings between the energized electrodes, and between any of these electrodes and adjacent electrical grounds. This differential in potential gradients effects the treating abilities within the electric treater 11. The spacings S, W, D and G could be adjusted to provide a uniform potential gradient, but the resulting treater construction is vastly complicated.

In accordance with the present invention, the energized electrodes are energized by three phase AC current through conductors 42, 43 and 44 from a transformer 41. For example, these conductors may carry 440 volts AC current to the transformer 41. Usually, choke devices (not shown) are placed in series with each of these conductors to protect the transformer 41 from excessive current demands should high current consumption occur within electrical field treater 11, or for other reasons. The transformer 41 receives the current from the conductors 42, 43 and 44 through primary windings. These primary windings are connected magnetically to three secondary windings which provide three phase line voltages of high potential through insulated conductors 46, 47 and 48 to the energized electrodes 32, 33 and 31, respectively. For example, the high potential provided by each secondary winding of the transformer 41 could be 16,000 volts AC relative to the vessel 12. The secondary windings of the transformer 41 connect to entrance bushings 51, 52 and 53, which conduct current flow through the metal sidewalls of the vessel 12. These bushings interconnect the conductors 46, 47 and 48 through flexible leads 54, 55 and 56 to the energized electrodes 32, 33 and 31, respectively.

The electric field produced by energization of the electrodes 31, 32 and 33 results in the dispersion above the interface 21 producing a purified continuous oil phase. This oil phase is removed through an outlet collector assembly 57 and transferred through a pipe 58 to a subsequent utilization. The water phase coalescing in the electrical field from the dispersion passes downwardly through the interface 21 and merges into the body of water 19. FIG. 1 illustrates one embodiment of an electric treater 11 of the present invention which is capable of resolving a dispersion into a purified continuous oil phase and a coalesced water phase with electrodes 32 and 33 energized to the same potential relative to the electrode 31, and all electrodes relative to electrical grounds on the vessel 12. This advantageous result is accomplished by employing a unique arrangement of the polyphase secondary windings in the transformer 41.

Referring to FIG. 2, the transformer 41 is illustrated as the assemblage within the chain-lined enclosure. The conductors 42, 43 and 44 apply the three phase AC current, from a suitable source, to the primary windings 61, 62 and 63, respectively. The primary windings may be arranged in a Y connection, if desired. Preferably, these primary windings are arranged in a delta configuration since the transformer 41 steps up the voltage magnitude in the secondary windings. The magnetic core connection between the primary and secondary windings of the transformer 41 is not shown in the drawing. However, the primary and secondary windings are magnetically coupled by either a common core assembly, or by the common vector summed current flow through two of the conductors relative to any third conductor carrying current primary windings in three separate transformers. The transformer 41 carries secondary windings 66, 67 and 68 which produce the desired magnitude of high voltage to be applied to the energized electrodes.

More particularly, the secondary winding 66 is connected by the conductor 46 to the electrode 32; the secondary winding 67 is connected by the conductor 47 to the electrode 33; and the secondary winding 68 is connected by the conductor 48 to the electrode 31. The secondary windings 66 and 67 are connected at one end to neutral point 69 and by a ground conductor 59 which connects to the metal sidewalls of the vessel 12. The secondary windings 66 and 67 are connected in the conventional Y fashion with the line voltages in conductors 46 and 47 being in a phase relationship of 120° apart. In completing the conventional Y connection, the secondary conductor 68 would be connected in a phase relationhip of 120° relative to the secondary windings 66 and 67. Thus, the line voltages would be phased 120° in all the secondary windings. However, in the present invention, the secondary winding 68 is connected 180° out of phase of its normal Y connection relative to the secondary windings 66 and 67. More particularly, the end of the secondary winding 68 adjacent the neutral point 69 is connected by the conductor 48 to the electrode 31. The remote end of the winding 68 connects to the neutral point 69 which is the common connection between the secondary windings 66 and 67 and the grounded conductor 59. As a result, the line voltage in conductor 48 is 60° in phase apart from both the line voltages on conductors 46 and 47. This arrangement of the secondary windings of the transformer 41 provides that the line voltages E1 and E2 between the conductors 46 and 48, and conductors 47 and 48, respectively, have the same magnitudes. The line voltage E3 present between conductors 46 and 47 is 1.73 times either of the line voltages E1 and E2. However, since the line voltage E3 appears between electrodes 32 and 33 which are remotely spaced apart in the vessel 12, the effects of this increased potentials on the energized electrodes is very minor. The voltages applied to the electrodes are all equal in magnitude relative to the grounded connections provided by the metal sidewalls of the vessel 12, the interface 21 and the grounded electrode 38.

The operation of the transformer 41 may be more readily appreciated by reference to the vector display of the line voltages illustrated in FIG. 3. The phase voltages across secondary windings 66, 67 and 68 are represented by vectors 71, 72 and 73, respectively. The phase voltages in vectors 71 and 73, and 72 and 73, are at a phase relationship of 60°. The phase voltages in vectors 71 and 72 are at a phase relationship of 120°. As a result, line voltages E1 and E2 are equal in magnitude. The line voltage E3 is 1.73 times the magnitude of either E1 or E2. However, all the phase voltages are equal in magnitude and also are equal to line voltages E1 and E2. Therefore, the potential difference (line voltages E1 and E2) between energized electrodes 31 and 32, and 31 and 33, are equal in magnitude, and the particular magnitude is the phase voltage across the secondary windings of the transformer 41. Also, the particular potential to which these electrodes are energized is equal to the phase voltage across the secondary windings 66, 67 and 68 relative to neutral point 69 and the grounded metal sidewalls of the vessel 12.

In FIG. 3 a dash line indicates the phase voltage as vector 73' as it would be in a conventionally arranged Y connection of the secondary winding 68 of the transformer 41. It will be apparent that the phase voltage in vector 73 of the transformer 41 according to the present invention is 180° out of phase from the conventional vector 73' as it was employed in prior applications of three phase energization of electrical field treaters.

The treater 11 is preferably arranged with the vessel 12 taking the form of a horizontally-oriented, cylindrical vessel with metal sidewalls. Preferably, the electrodes 31, 32 and 33 are spaced equidistantly from one another and also from adjacent grounds upon the vessel 12, the interface 21 and the grounded electrode 38. However, the arrangement of the electrical field treater 11 may take other forms than is illustrated in the drawings. For example, the vessel 12 may be spherical in configuration or may be positioned with its longitudinal axis in the vertical. The electrode 31, 32 and 33 may be arranged as circular elements in a horizontal plane within the vessel 12. Also, these electrodes could be spaced in a vertical mounted relationship. Other arrangements for the electric field treater 11 will be apparent to those skilled in the art.

The arrangement in the transformer 41 of the secondary windings 66, 67 and 68 according to the present invention provides all of the advantages of the three phase energization of an electric treater including a common ground connection between the secondary windings and the metal sidewalls of the vessel 12. In addition, the other advantages of being able to energize the electrodes 31, 32 and 33 to the same potential relative to each other and to the grounded metal sidewalls is obtained. More particularly, the spacings S, D, W and G may be made of like dimension so that all electric fields within the electrical field treater 11 have the same potential gradient in which the dispersion is resolved. Thus, the problems are avoided in adjusting the spacings to maintain a uniform potential gradient in the electric field of a treater energized from a conventional Y arranged secondary of a high voltage polyphase transformer.

From the foregoing, it will be apparent that there has been provided an electric field treater which has a novel arrangement for energizing electrodes in such a manner that the potentials obtained from a polyphase transformer are equal in magnitude between electrodes, and also between these electrodes and electrical grounds on a metal vessel. Various changes and modifications may be made to the structure of the present electric field treater without departing from the spirit of the invention. It is intended that the present description be taken in illustration of the present invention. The appended claims define the scope of the present invention.

What is claimed is:

1. An electrical field treater operating from three phase AC current for resolving a dispersion formed of a continuous oil phase containing a dispersed water phase, said treater comprising:
   (a) a metal sidewalled vessel;
   (b) inlet means for introducing the dispersion into said vessel and outlet means to remove from said vessel the continuous oil phase and coalesced water phase;
   (c) transformer means having three phase primary windings connected to a source of three phase AC current, and said transformer means having three secondary windings magnetically coupled to said primary windings with each of said secondary windings having a common connection to a conductor grounded to the metal sidewalls of said vessel, two of said secondary windings being phased 120° apart and the third secondary winding being phased 60° apart from the other two of said secondary windings;
   (d) first, second, and third electrode means mounted in electrical isolation to said vessel and said electrode means adapted to be energized from said transformer means to a potential creating an electrical field suitable to promote resolution of the dispersion, said first electrode means mounted centrally within said vessel and said second and third electrode means mounted adjacent said first electrode means in said vessel; and
   (e) high tension conductors interconnecting said secondary windings of said transformer means with said electrode means, said first electrode means being energized from said third secondary winding, and said second and third electrode means being energized from said first and second secondary windings, respectively, whereby said electrode mans are energized to substantially the same potential differential relative to one another and to the metal sidewalls of said vessel.

2. The electrical field treater of claim 1 wherein said primary windings are arranged in a delta connection which receives power from the source of three phase AC current.

3. The electrical field treater of claim 1 wherein said primary and secondary windings are arranged for stepping up the voltage of the three phase AC current applied to said transformer means.

4. The electrical field treater of claim 1 wherein said secondary windings of said transformer means energize said electrode means to a potential between 10 and 30 kilovolts relative to the metal sidewalls of said vessel.

5. The electrical field treater of claim 1 wherein said electrode means have substantially equal surface areas exposed to fluids and have substantially equidistant spacings from one another and the adjacent electrical grounds on said vessel.

6. An electrical field treater operating from three phase AC current for resolving a dispersion formed of a continuous oil phase containing a dispersed water phase, said treater comprising:

(a) a horizontally disposed cylindrical vessel with metal sidewalls and end;

(b) inlet means for introducing the dispersion into said vessel and outlet means to remove from said vessel the continuous oil phase and coalesced water phase;

(c) transformer means having three phase primary windings connected to a source of three phase AC current, and said transformer means having three secondary windings magnetically coupled to said primary windings with each secondary winding having a common connection to a conductor grounded to the metal sidewalls and ends of said vessel, two of said secondary windings being phase 120° apart and the third secondary winding being phased 60° apart from the other two of said secondary windings;

(d) first, second and third energized electrodes mounted in electrical isolation to said vessel and said electrodes adapted to be energized from said transformer means to a potential creating an electrical field suitable to promote resolution of said dispersion into the continuous oil phase and a coalesced aqueous phase;

(e) said energized electrodes having a planar configuration with a metal construction mounted in the same horizontal plane in said vessel, and said energized electrodes having substantially the same horizontal surface area exposed to fluids in said vessel;

(f) said first energized electrode mounted centrally within said vessel and said second and third energized electrodes mounted on opposite sides of said first energized electrode in said vessel;

(g) high tension conductors interconnecting said secondary windings of said transformer means with said energized electrodes, said first energized electrode being energized from said third secondary winding, and sain second and third electrodes being energized from said first and second secondary windings, respectively, whereby said energized electrodes are energized to substantially the same potential differential relative to one another and to the electrical ground of said vessel.

7. The electrical field treater of claim 6 wherein said energized electrodes are spaced equidistantly from the adjacent metal portions of said vessel and said second and third energized electrodes from said first energized electrode.

8. The electrical field treater of claim 6 wherein a planar grounded electrode is mounted in a horizontal plane adjacent said energized electrodes.

9. The electrical field treater of claim 7 wherein a planar grounded electrode is mounted in a horizontal plane adjacent said energized electrode at substantially the saime equidistant spacing between said first energized electrode and said second and third energized electrodes, and the adjacent metal portions of said vessel.

10. The electrical field treater of claim 9 wherein said energized electrodes are energized to a potential producing an electrical field between said electrodes, the adjacent metal portions of said vessel and said grounded electrode with a gradient between .5 and 6 kilovolts per inch traversed by the electrical field.

11. The electrical field treater of claim 6 wherein said primary windings are arranged in a delta connection which receives power from the source of three phase AC current.

12. The electrical field treater of claim 6 wherein said primary and secondary windings are arranged for stepping up the voltage of the three phase AC current applied to said transformer means.

13. The electrical field treater of claim 6 wherein said secondary windings of said transformer means energize said energized electrodes to a potential between 10 and 30 kilovolts relative to the metal portions of said vessel.

References Cited

UNITED STATES PATENTS

| | | | |
|---|---|---|---|
| 2,033,143 | 3/1936 | McDonald | 204—305 |
| 2,033,429 | 3/1936 | Hanson, et al. | 204—305 |
| 2,072,888 | 3/1937 | Kiech | 204—189 |
| 2,382,699 | 8/1945 | Deutsch | 204—191 |
| 2,855,359 | 10/1958 | Woelflin | 204—302 |

THOMAS M. TUFARIELLO, Primary Examiner

U.S. Cl. X.R.

204—191

UNITED STATES PATENT OFFICE
CERTIFICATE OF CORRECTION

Patent No. 3,794,578  Dated February 26, 1974

Inventor(s) Frederick D. Watson

It is certified that error appears in the above-identified patent and that said Letters Patent are hereby corrected as shown below:

Column 1, lines 61-46, the sentence "The physical+++6,000 volts AC." should be omitted.

Column 3, lines 25-26, "sidewalls of" should read -- in the fol- --.

Column 6, line 14, after "vessel 12.", insert the sentence:
---The energized electrodes may be energized to a potential to produce an electrical field between the electrodes, the adjacent metal portions of the vessel 12, and the grounded electrode 38 with a gradient between .5 and 6 kilovolts per inch traversed by the electrical field."---

Column 7, line 72, for "is" read ---are---.

Column 9, line 4, for "end" read ---ends---;
line 14, for "phase" read ---phased---; and
line 39, for "sain" read ---said---.

Column 10, line 12, for "saime" read ---same---.

Signed and sealed this 24th day of September 1974.

(SEAL)
Attest:

McCOY M. GIBSON JR.
Attesting Officer

C. MARSHALL DANN
Commissioner of Patents